US006732678B2

United States Patent
Lin et al.

(10) Patent No.: US 6,732,678 B2
(45) Date of Patent: May 11, 2004

(54) APPARATUS AND METHOD FOR REPRODUCING ENERGY

(76) Inventors: Kuo Chang Lin, No. 463, Kung-Yeu 28 Rd., Taichung City (TW), 407; Chau Hwe Chen, No. 463, Kung-Yeu 28 Rd., Taichung City (TW), 407

( * ) Notice: Subject to any disclaimer, the term of this patent is extended or adjusted under 35 U.S.C. 154(b) by 43 days.

(21) Appl. No.: 10/171,669

(22) Filed: Jun. 17, 2002

(65) Prior Publication Data

US 2003/0230250 A1 Dec. 18, 2003

(51) Int. Cl.[7] .............................................. F02M 31/00
(52) U.S. Cl. ................. 123/25 R; 123/25 B; 123/41.54
(58) Field of Search ...................... 123/41.54, 25 B, 123/25 D, 25 R, 3, 41.14, 41.2, 41.22, DIG. 12

(56) References Cited

U.S. PATENT DOCUMENTS

| 1,250,912 | A | * | 12/1917 | McCorkle | .................. | 123/25 B |
| 4,509,464 | A | * | 4/1985 | Hansen | ...................... | 123/25 B |
| 4,515,135 | A | * | 5/1985 | Glass | ......................... | 123/25 B |
| 4,594,991 | A | * | 6/1986 | Harvey | ...................... | 123/25 B |
| 4,986,223 | A | * | 1/1991 | Mahoney | ................... | 123/25 B |
| 5,540,190 | A | * | 7/1996 | Rogers et al. | ............ | 123/25 R |
| 6,578,532 | B1 | * | 6/2003 | Rowley | ..................... | 123/25 R |

* cited by examiner

Primary Examiner—Henry C. Yuen
Assistant Examiner—Jason Benton
(74) Attorney, Agent, or Firm—Rosenberg, Klein & Lee

(57) ABSTRACT

An apparatus and method for reproducing energy in an engine driving system, the driving system has an engine with several cylinders and an cooling device connected to the engine, the cooling device has at least one water tank for outputting cooling water to the engine and inputting heated cooling water from the engine. A separator chamber connected to the engine and the water tank. When the heated water flows into the separator chamber from the engine, part of the heated water is decomposed into oxygen and hydrogen. The oxygen and hydrogen is delivered to the water tank from the separator chamber. A storage chamber store the oxygen and hydrogen from the water tank and deliver them to the cylinders of the engine as a reproduced fuel in order to enhance combustion and reduce the emitting of the exhaust of the engine.

8 Claims, 4 Drawing Sheets

APPARATUS AND METHOD FOR REPRODUCING ENERGY

TECHNICAL FIELD

This invention relates generally to an apparatus and method for reproducing energy, in particular, to enhance combustion in an engine driving system by delivering oxygen and hydrogen into the cylinders of the engine.

BACKGROUND OF THE INVENTION

In general, with fuels used in internal combustion engines, external combustion engines, and other combustion apparatus, exhaust gases are generated by combustion to release various types of noxious chemical substances into the atmosphere, thus causing an environmental pollution. These noxious chemical substances include, for example, CO, HC, NOx, and SOx. Heretofore, to suppress generation of such noxious chemical substances, fuel combustion efficiency has been improved by improving the quality of fuels used or by improving various combustion devices. In addition, the exhaust gases released have been treated by a variety of exhaust gas removing devices using catalysts to prevent pollution. However, such prior art methods have been insufficient to reduce pollutive substances, and the improvement of fuel quality has been difficult in view of the costs. To overcome the defects, recently, the industry intends to use fuel activation devices to enhance combustion and reduce harmful gases. In the U.S. Pat. Nos. 4,605,498, 4,711,271, 5,055,189, 5,044,346, 5,080,080, 5,460,144, 5,632,254 and 5,873,353, magnetic field effect or far infrared ray is used to activate fuel to decompose the fuel molecule and therefore enhance combustion and reduce the harmful gases.

Combustion includes fuel, hydrogen in the fuel and oxygen in the air. Activating fuel only improves-one element of combustion. Fuels like gasoline are composed mainly of carbon-hydrogen chemical compound with different molecule structures. The main elements of the compounds are carbon and hydrogen. The fuels, which contain high percentage of hydrogen usually, are easily ignited to produce power. Carbon and hydrogen are active elements. They can easily combine with oxygen and then blaze. Therefore if we can provide sufficient air (oxygen is about 20% of air), the combustion of the fuels will be efficient and less harmful gas will be produced. Adding more hydrogen and into combustion equipments like engines can reduce the consumption of fuels and adding oxygen can help the hydrogen both in the fuel and in the air burn and avoid the combine of carbon and hydrogen since usually carbon and hydrogen will combine as harmful gases.

SUMMARY OF INVENTION

It is therefore a primary objective of the present invention to provide an apparatus and method for reproducing energy that can enhance combustion.

Another object of the present invention is to provide an apparatus and method for reproducing energy that can reduce the production of harmful gases.

The present invention, briefly summarized, in one embodiment discloses an apparatus and method for reproducing energy used in engine driving systems. The driving system has an engine with several cylinders and a cooling device connected to the engine. The cooling device has at least one water tank for outputting cooling water to the engine and inputting heated cooling water from the engine. The apparatus comprises: (1) a separator chamber for separating liquid and gas and the separator chamber comprises: an input connected to the engine for receiving heated cooling water, some of the heated cooling water decomposed into oxygen and hydrogen; a first output, connected to the water tank, for outputting the heated cooling water to the water tank; and a second output, connected to the water tank, for outputting the oxygen and hydrogen to the water tank. (2) a storage chamber, with an input connected to the water tank for receiving oxygen and hydrogen inside the tank and an output connected to the engine for outputting the oxygen and hydrogen to the cylinders.

In order to reduce the load of compressing process of the cylinders and efficiently use the heat produced by the engine, the storage chamber may first connected to a joint then connected to the engine and the joint connected to a heat collector collecting heat from the engine and preheating the oxygen and hydrogen passing through the joint.

In order to increase the amount of the collection of oxygen and hydrogen, the apparatus further comprises a gas bypass in the way that the separator chamber further comprises a third output connected to the gas bypass and the storage chamber further comprises a second input connected to the gas bypass for receiving the oxygen and hydrogen from the gas bypass.

In order to avoid abnormal pressure in the engine, a pressure regulator is recommended installed on the engine.

BRIEF DESCRIPTION OF DRAWINGS

The invention will be more clearly understood after refer to the following detailed description read in conjunction with the drawings wherein.

DETAILED DESCRIPTION OF PREFERRED EMBODIMENTS

Figure 1:
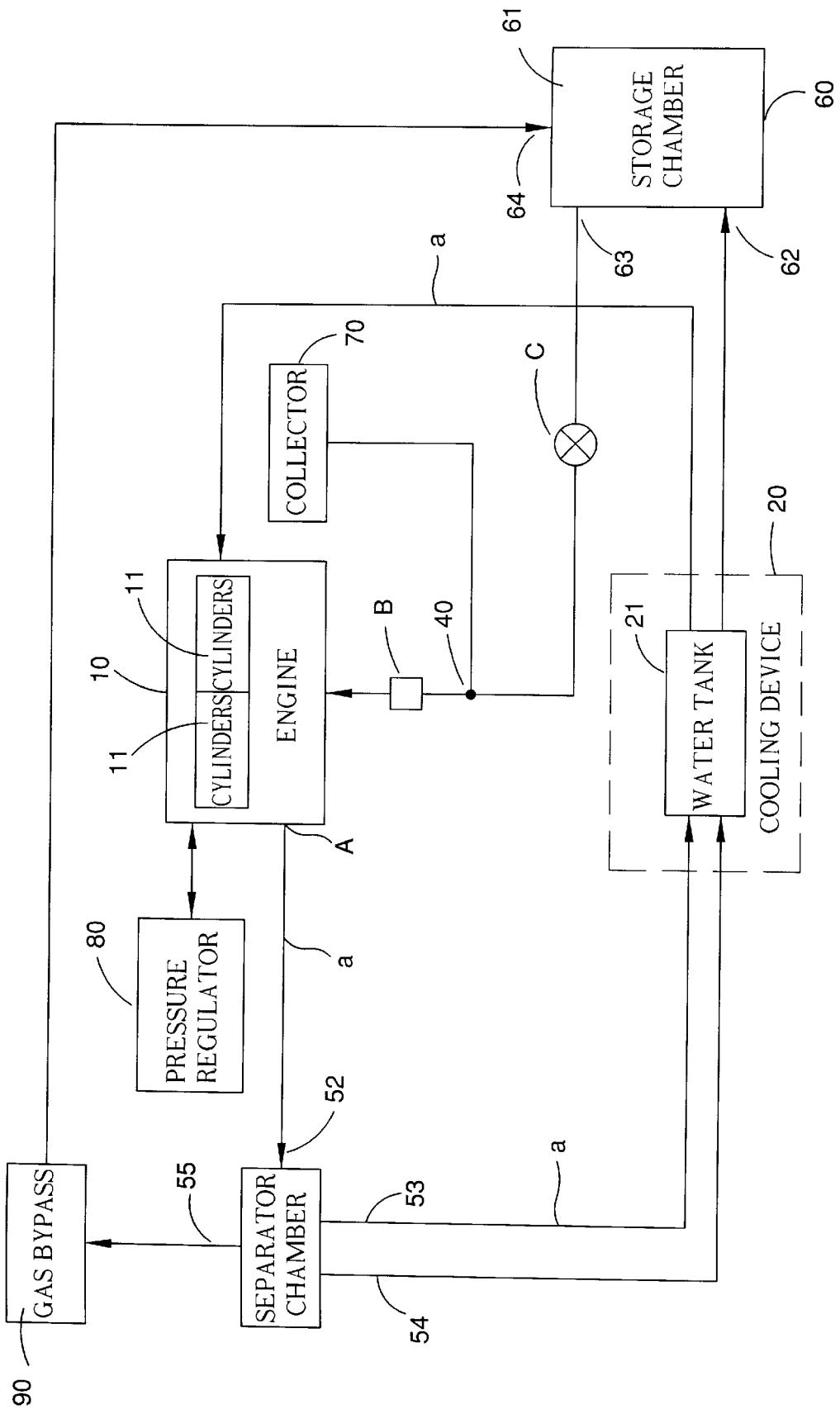
FIG. 1 is a block diagram of the embodiment.

With reference to FIG. 1, the embodiment is used in an engine driving system, the driving system has an engine 10 with several cylinders 11 and an cooling device 20 connected to the engine 10, the cooling device 20 has at least one water tank 21 for outputting cooling water to the engine 10 and inputting heated cooling water from the engine 10. Part of the heated water is decomposed into oxygen and hydrogen because of high temperature. The method of the embodiment comprises the following steps: delivering the oxygen and hydrogen into the water tank 21; storing the oxygen and hydrogen from the water tank 21; and delivering the stored oxygen and hydrogen into the cylinders 11.

There are following advantages of adding extra oxygen and hydrogen into the combustion devices like engines: 1. Adding extra hydrogen into an engine can efficiently increase igniting energy and the engine can output more power to related mechanism. If the engine is used in automobiles, the power of the automobiles are increased; 2. Adding extra oxygen can help fuels flame more efficiently. If the engine is used in automobiles, the automobiles will reduce the emitting of exhaust. It's good for the environments; and 3. If we don't consider raising the power of the engine, the extra oxygen and hydrogen can reduce the consumption of fuels like gasoline since the hydrogen is a flammable material. If the engine is used in automobiles, the user can save the fee of fuel.

Therefore, we know that through the invention, hydrogen and oxygen can easily be obtained from traditional engine driving system and used as a reproduced fuel to replace part of the fuel and enhance combustion. The method of the embodiment can further comprise: collecting the heat from the engine then heating the oxygen and hydrogen by the collected heat. This is to preheat oxygen and hydrogen before they are delivered to the cylinders 11. The purpose is to heat the oxygen and hydrogen in advance, so they can quickly reach ignition point after they enter the cylinders 11. Therefore the cylinders 11 can save the compression process and extend their usage life. This step also efficiently use the heat produced by the engine to heat the hydrogen and oxygen. Therefore, the temperature of the engine 10 can be reduced and the cooling device 20 also reduces the burden of cooling the engine 10. That is to say the rotation of the fan are also be reduced and the temperature of the water tank 21 is also lowered. This is good for the whole engine driving system. For the user, he doesn't have to worry about the hot water will jet out when opening the cover of the water tank.

Figure 2:
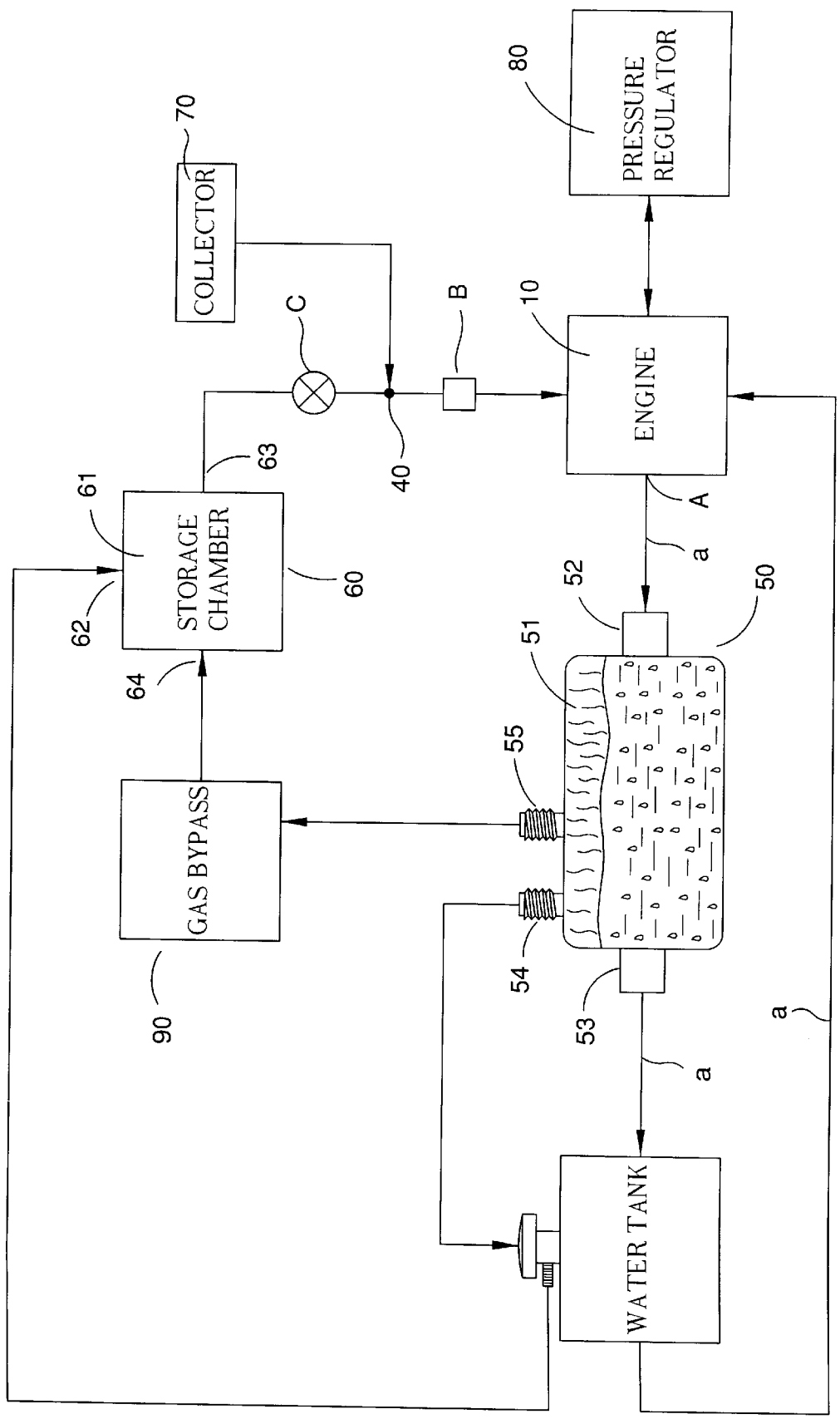
FIG. 2 is a functional diagram of the embodiment with the separator chamber in details.

The apparatus of the embodiment comprises a separator chamber 50 and a storage chamber 60. The separator chamber 50 is for separating liquid and gas, which comprises: an input 52 connected to the engine 10 for receiving heated cooling water, some of the heated cooling water is decomposed into oxygen and hydrogen; a first output 53, connected to the water tank 21, for outputting the heated cooling water to the water tank 21; and a second output 54, connected to the water tank 21, for outputting the oxygen and hydrogen to the water tank 21. The oxygen and hydrogen will follow the route of the cooling water (indexed as "a" in FIG. 1 and FIG. 2) flow into the separator chamber 50. Since gas is lighter and the flowing speed is faster, so hydrogen and oxygen can flow into the water tank 21 earlier. The temperature inside the water tank 21 is high enough to produce more hydrogen and oxygen.

The storage chamber 60 with sufficient space 61 has an input 62 connected to the water tank 21 for receiving oxygen and hydrogen inside the tank 21 and an output 63 connected to the engine 10 for outputting the oxygen and hydrogen to the cylinders 11.

Figure 4:
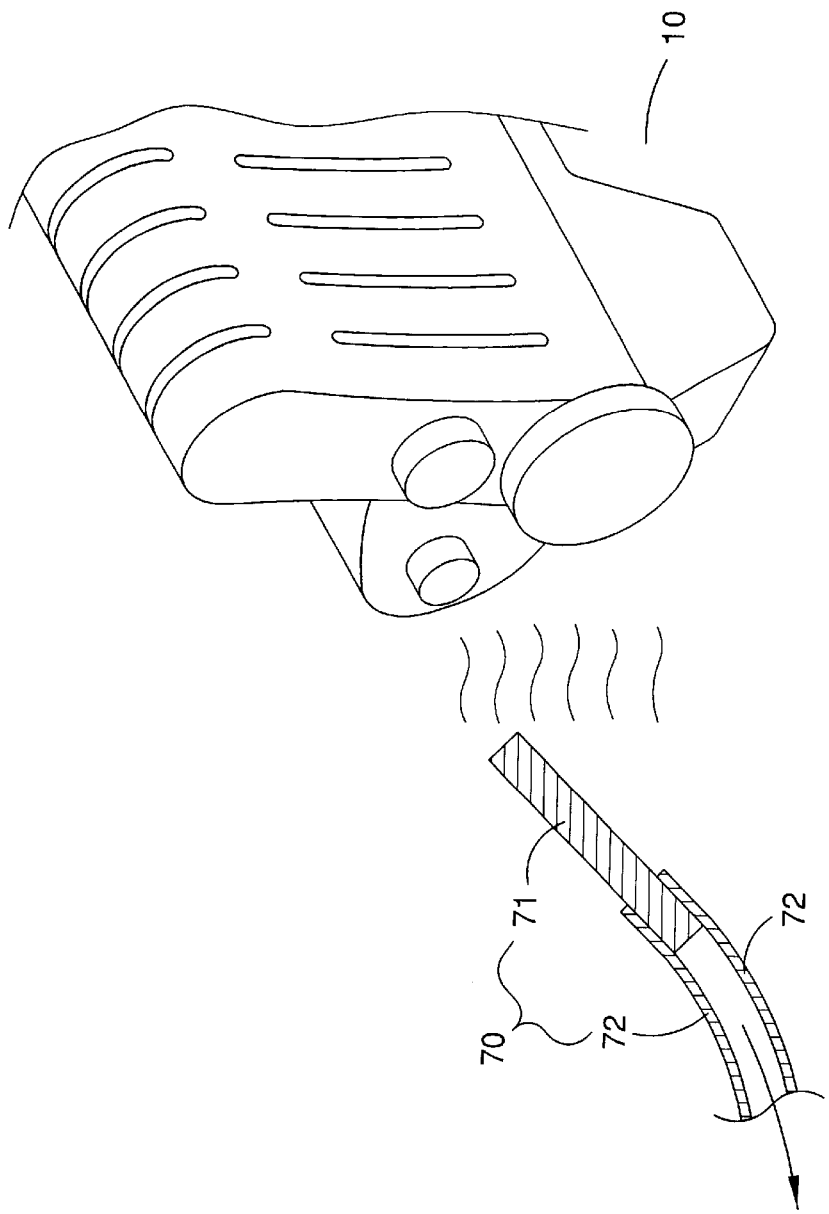
FIG. 4 is a perspective view of the heat collector of the embodiment.

In order to reduce the load of compression process of the cylinders and efficiently use the heat produced by the engine, the storage chamber 60 may first connected to a joint 40 then connected to the engine 10 and the joint 40 connected to a heat collector 70 collecting heat from the engine 10 and preheating the oxygen and hydrogen passing through the joint 40. With reference to FIG. 4, the collector 70 can be a heat absorber rod 71 sleeved to a tube 72. Install the heat absorber rod 71 near the engine to absorb the heat from the engine and deliver the heat through the tube 72 to the joint 40 in order to heat the oxygen and hydrogen passing through the joint 40. The joint 40 can be a Tee joint.

A pumper B can be installed between the storage chamber 60 and the engine 10 in order the oxygen and hydrogen can be efficiently pumped into the engine 10. A current regulator C can also be installed between the storage chamber 60 and the engine 10 in order to control the amount of the hydrogen and oxygen delivered to the engine 10.

The combustion of the engine needs oxygen from the air. Generally speaking, air is from outside of the engine through an air filter into the engine 10 and then mixed with the fuel jetted from the sprayer in certain portion and finally enter the cylinders 11 through a gas-entering valve D. Therefore, we can arrange the output 63 of the storage chamber 60 to the position that can enter the gas entering valve D, for example, between the air filter and the sprayer and the oxygen and hydrogen inside the storage chamber will be sucked into the engine 10.

Figure 3:
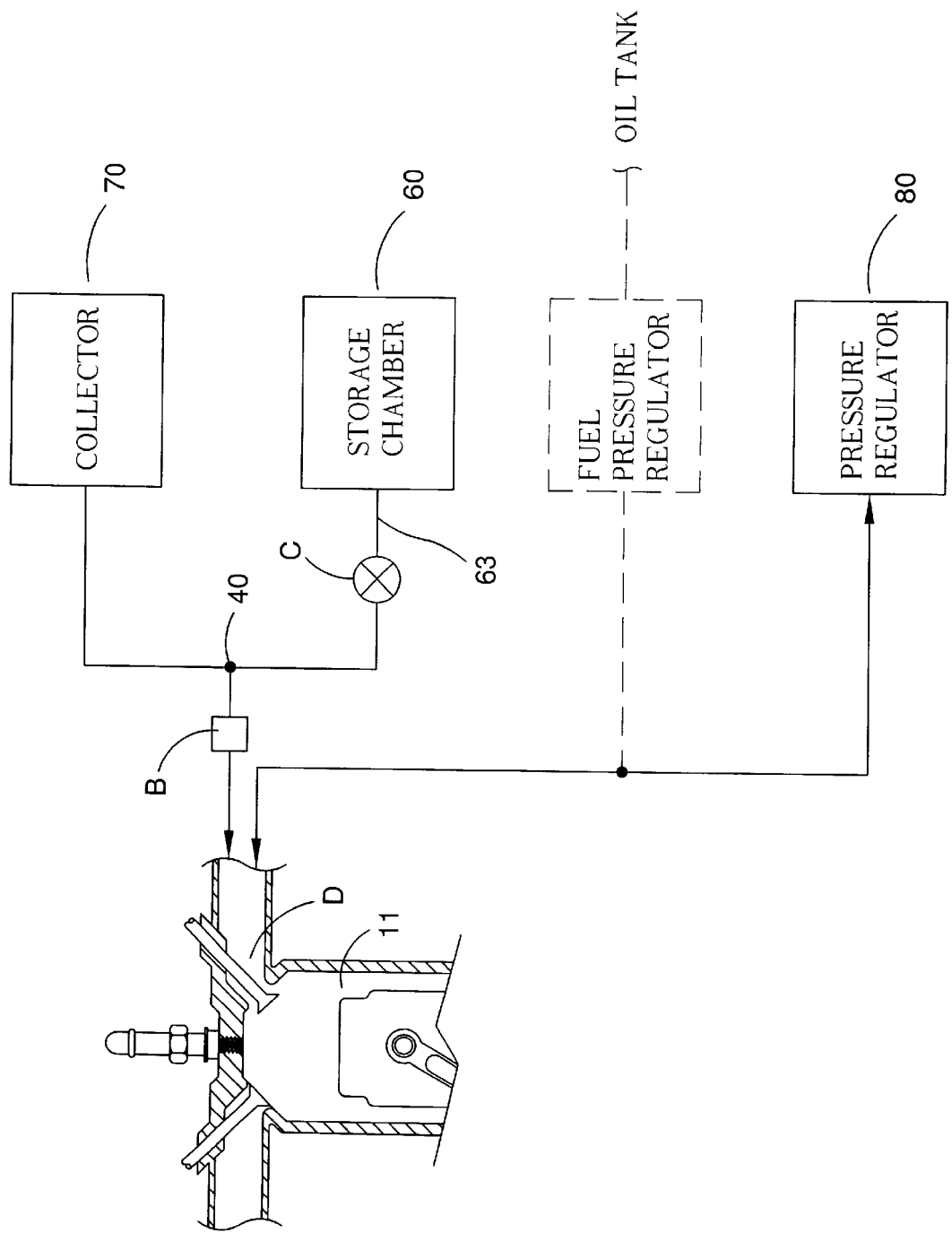
FIG. 3 is a perspective view between the embodiment and the cylinders.

It is possible that when providing of the oxygen and hydrogen is too much, it will cause the pressure inside the engine too high in an instant. To solve this problem, we can install a pressure regulator 80 connected to the tube between the engine 10 and fuel pressure regulator (See FIG. 3) to release over pressured gas.

In the traditional engine driving system, generally speaking, a fuel pressure regulator is installed to adjust the pressure in the fuel tube. The fuel pressure regulator will have a tube connected to oil tank to collect surplus oil. However the pressure regulator 80 doesn't have tube connected to oil tank since there will be no surplus oil through the efficient combustion of the present invention.

In order to increase the amount of the collection of oxygen and hydrogen, the apparatus further comprises a gas bypass 90 in the way that the separator chamber 50 further comprises a third output 55 connected to the gas bypass 90 and the storage chamber 60 further comprises a second input 64 connected to the gas bypass 90 for receiving the oxygen and hydrogen from the gas bypass 90.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extend indicated by the broad general meaning of the terms in which the appended claims are expressed.

We claim:

1. An apparatus for reproducing energy used in an engine driving system, said driving system having an engine with a plurality of cylinders and a cooling device connected thereto, said cooling device having at least one water tank for outputting cooling water to said engine and inputting heated cooling water from said engine, said apparatus comprising:

a separator chamber for separating liquid and gas comprising: an input connected to said engine for receiving heated cooling water, at least a portion of said heated cooling water being is decomposed into oxygen and hydrogen; a first output connected to said water tank for outputting said heated cooling water to said water tank; and a second output connected to said water tank for outputting said oxygen and hydrogen to said water tank;

a storage chamber having an input connected to said water tank for receiving oxygen and hydrogen inside said tank and an output connected to said engine for outputting said oxygen and hydrogen to said cylinders;

a gas bypass connected to a third output of said separator chamber further including a third output connected to said gas bypass, said storage chamber further including a second input connected to said gas bypass for receiving said oxygen and hydrogen from gas bypass.

2. The apparatus of claim 1, wherein said storage chamber first is connected through a joint to said engine, said joint being connected to a heat collector disposed to collect heat from said engine and heat the oxygen and hydrogen passing through said joint.

3. The apparatus of claim 1, wherein said engine further comprises a pressure regulator thereon.

4. The apparatus of claim 1, wherein said storage chamber and said engine have a current regulating valve between them.

5. The apparatus of claim 1, wherein said storage chamber and said engine have a pumper between them.

6. The apparatus of claim 4, wherein said storage chamber and said engine have a pumper between them.

7. A method for reproducing energy used in an engine driving system, said driving system having an engine of a plurality of cylinders and cooling device connected thereto, said cooling device having at least one water tank for outputting cooling water to said engine and inputting heated cooling water from said engine, said method comprising the steps of:

decomposing at least a portion of said heated cooling water into oxygen and hydrogen;

delivering said oxygen and hydrogen into said water tank;

storing said oxygen and hydrogen from said water tank in a storage chamber outside said water tank;

delivering said stored oxygen and hydrogen into said cylinders; and, establishing a gas bypass and directly passing to said storage chamber therethrough at least a portion of said oxygen and hydrogen resulting from said decomposition of said heated cooling water portion.

8. The method of claim 7, further further comprising the step of collecting the heat from said engine then heating said oxygen and hydrogen by the collected heat.

* * * * *